Nov. 28, 1950     T. CARRIGAN     2,532,056
DYNAMIC BALANCE TESTER
Filed Jan. 8, 1946     5 Sheets-Sheet 1
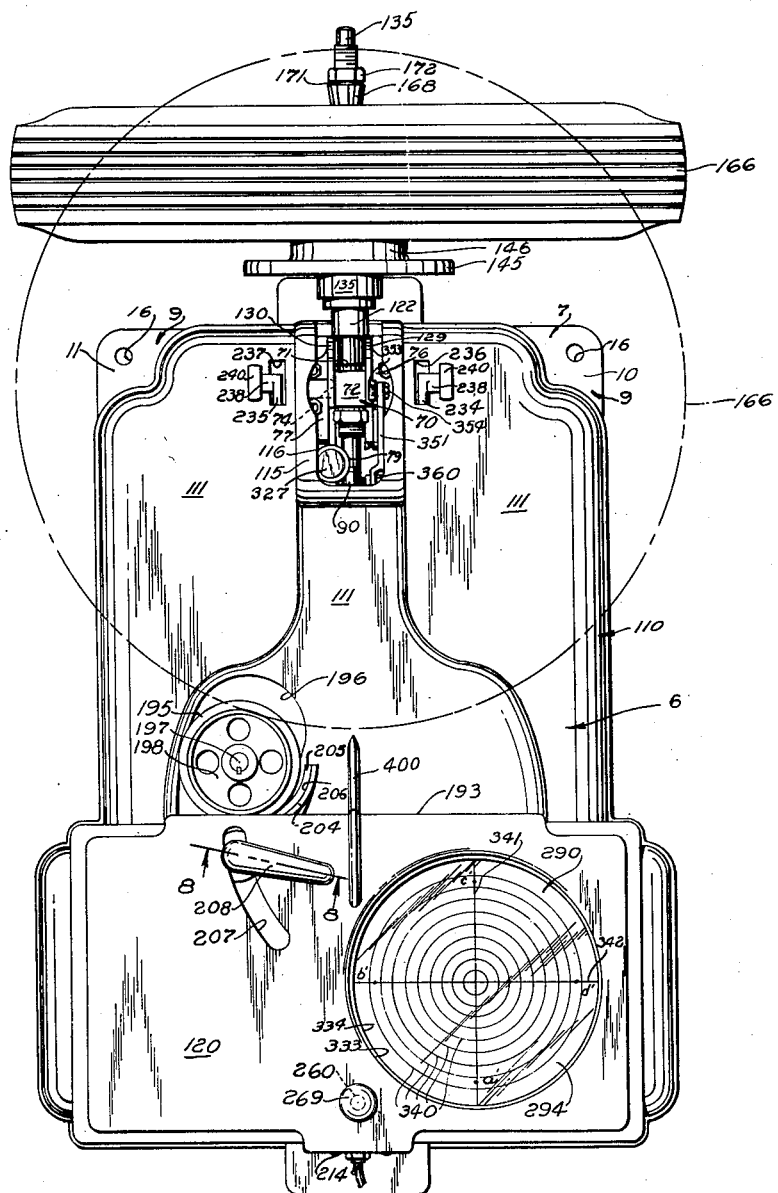
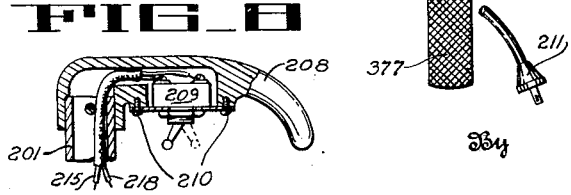
Inventor
TRACY CARRIGAN.
By Philip A. Minnis
Attorney

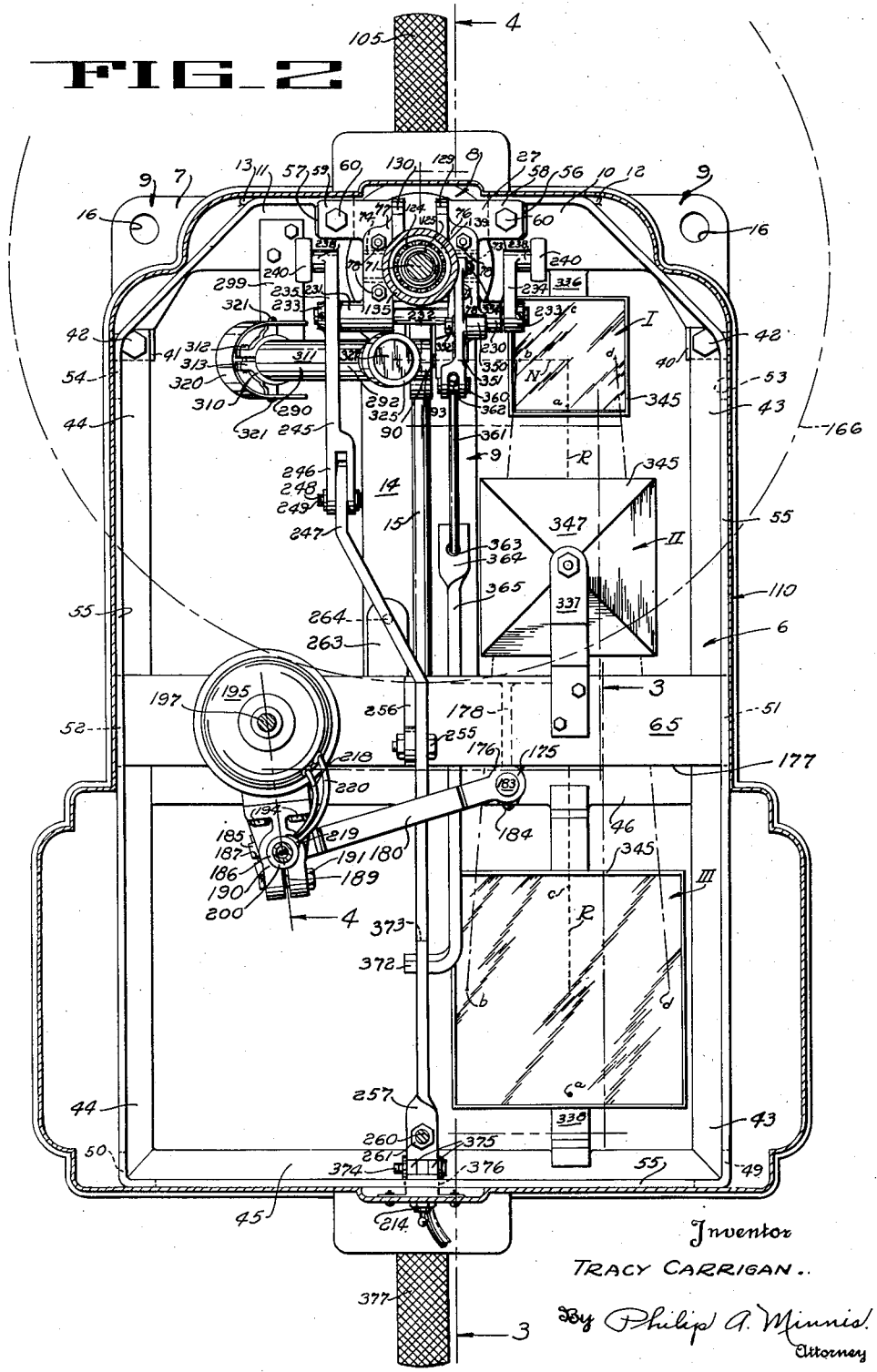

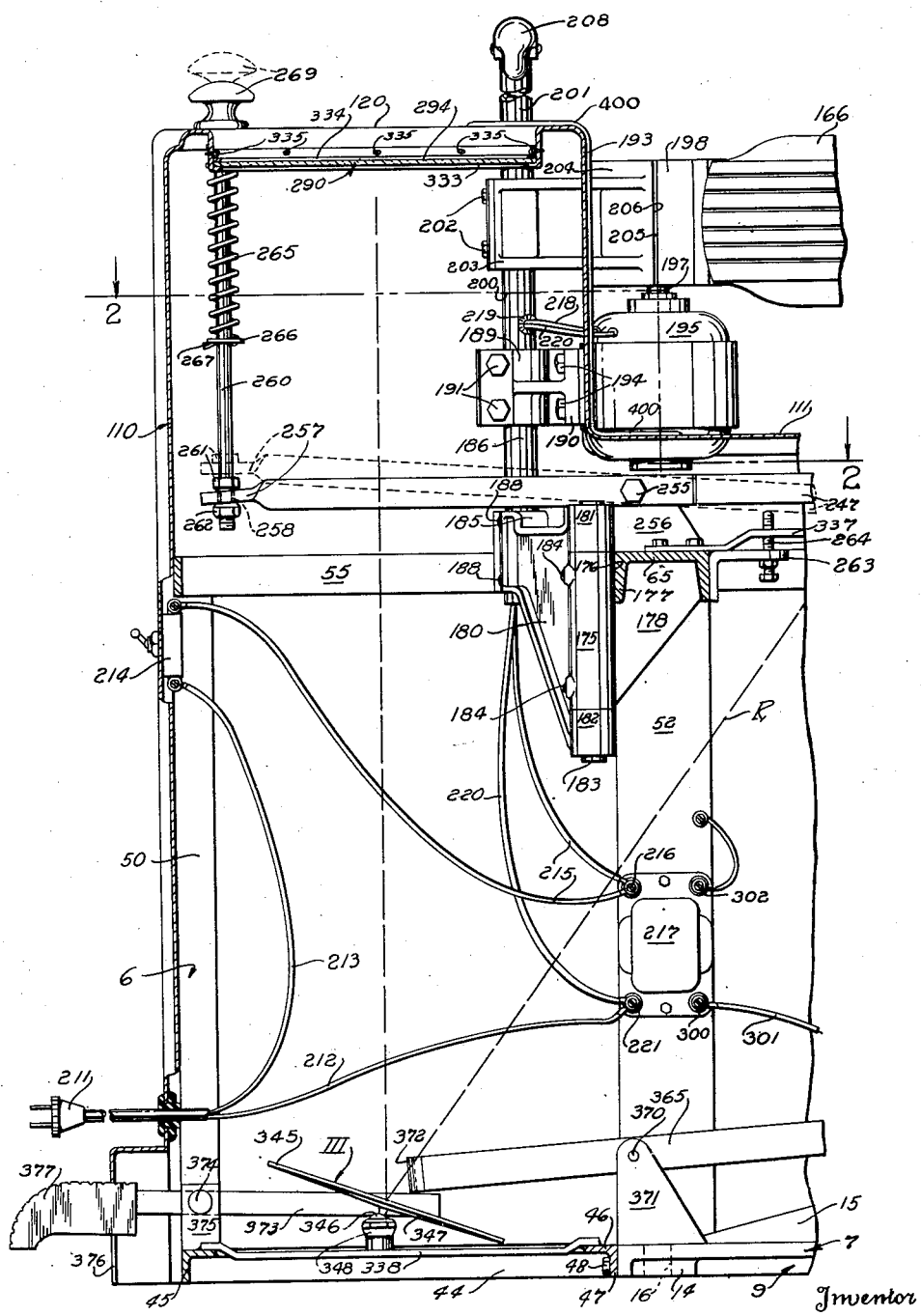

Nov. 28, 1950 T. CARRIGAN 2,532,056
DYNAMIC BALANCE TESTER
Filed Jan. 8, 1946 5 Sheets-Sheet 4
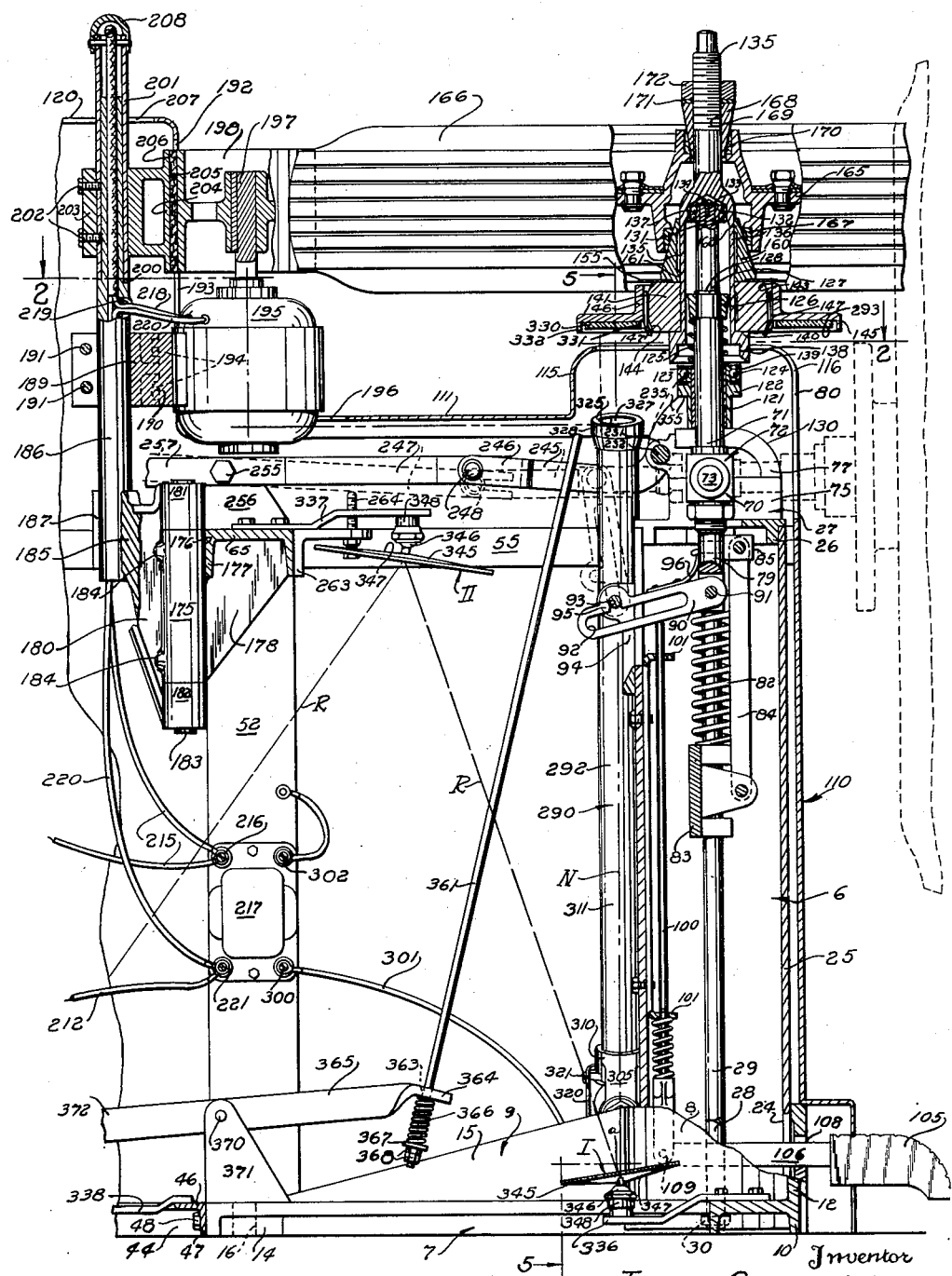
FIG_4
Inventor
TRACY CARRIGAN.
By Philip A. Minnis
Attorney

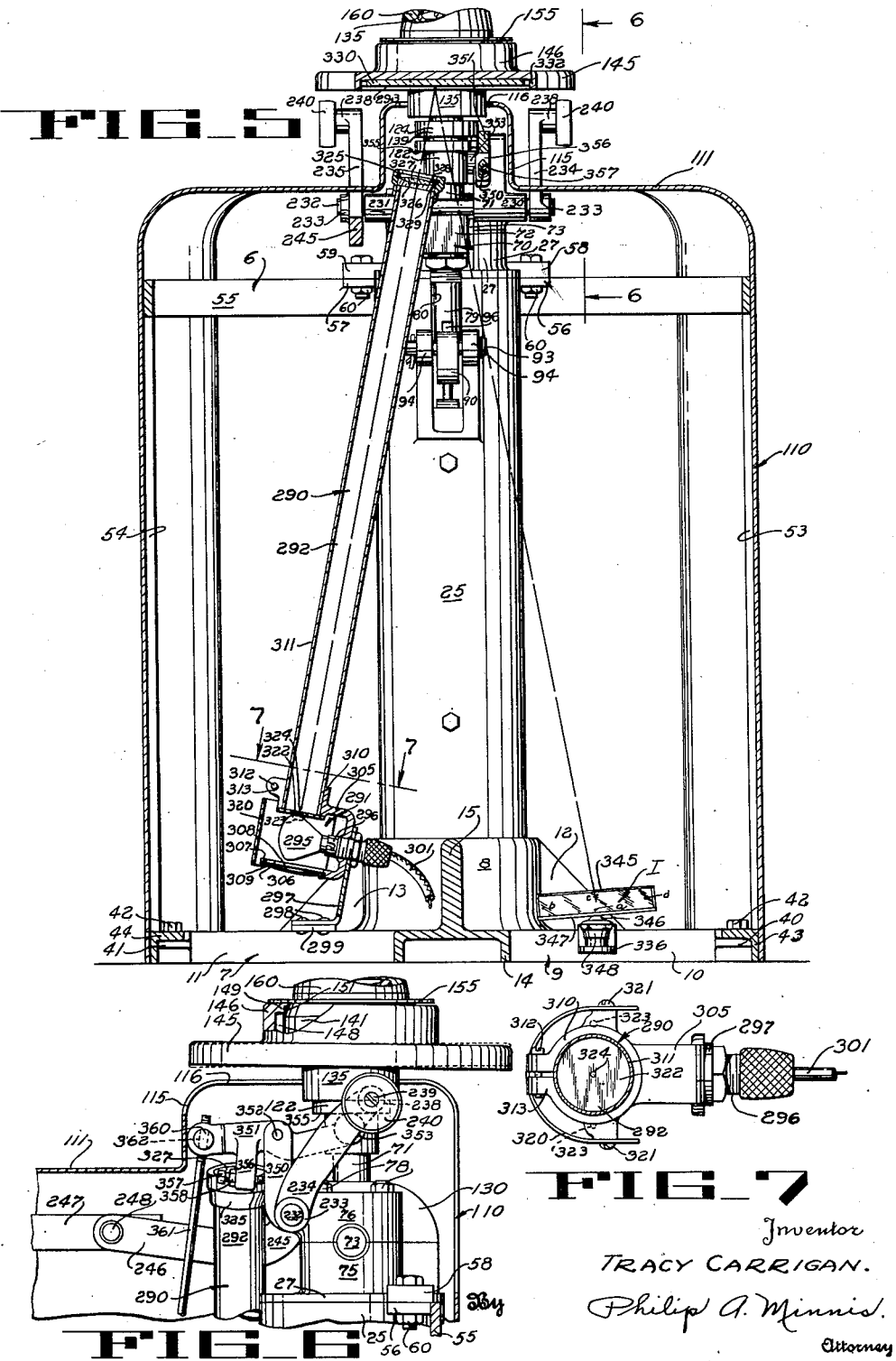

Patented Nov. 28, 1950

2,532,056

UNITED STATES PATENT OFFICE 2,532,056

DYNAMIC BALANCE TESTER

Tracy Carrigan, Lansing, Mich., assignor to Food Machinery and Chemical Corporation, a corporation of Delaware Application January 8, 1946, Serial No. 639,803

14 Claims. (Cl. 73—66)

This invention relates to machines for testing the balance of rotative bodies, such as automobile wheels.

The invention herein is particularly concerned with improvements in dynamic balance testers for indicating the amount and location of dynamic unbalance in rotative bodies.

In prior known dynamic balance testers it has been the practice to employ a detector mechanism adapted to engage the rotating body to be tested to transfer vibrations therefrom to an indicator mechanism. This is commonly accomplished by the use of an actuating mechanism which mechanically engages the body; or by an indicator actuating pin which contacts a wobble plate associated with the body.

In body engaging detectors indication takes place only while the body is rotating and correction can only be made after the body ceases rotating, consequently correction of the dynamic unbalance thereof must be made from memory. In wobble plate contacting indicators an accurate indication of the location and amount of dynamic unbalance is given only when the diametrical axis of the body on which the dynamic unbalance is located is in a predetermined position relative to the indicator.

In balance testers employing either of the above types of detector mechanisms a stationary member must mechanically engage a movable member and, therefore, both members are subject to considerable wear requiring frequent inspection and adjustment.

One object of the present invention is to provide an improved dynamic balance tester wherein the mechanical indicator mechanism has been eliminated and which is of simple and economical construction and highly efficient in use.

Another object is to provide a balance testing apparatus with an optical indicator for portraying the amount and location of dynamic unbalance of the body tested after the body ceases rotating.

Another object is to simulate the wobble of a dynamically unbalanced body after the body ceases wobbling and to reflect an image of a light beam onto a screen in accordance with the simulated wobble thereby registering the amount and location of dynamic unbalance of the body.

A further object of the invention is to provide an optical indicator including a reflector associated with the body to be tested for rotation therewith and adjustable, during spinning of the body, into angular position relative thereto dependent upon the amount and location of the dynamic unbalance of the body so that when the body and reflector are subsequently rotated about a predetermined axis the reflector will cast an image of a light beam projected thereonto, at an angle in proportion to the amount, and in a direction dependent upon the location of the dynamic unbalance of the body.

Other objects and advantages of the present invention will appear more fully in the following description in connection with the drawings in which:

Fig. 1 is a top view of a wheel balancer embodying the present invention and having a wheel mounted thereon with its axis horizontal.

Fig. 2 is an enlarged horizontal section of Fig. 1, the view being taken along lines 2—2 of Figs. 3 and 4.

Fig. 3 is a fragmentary vertical section taken along line 3—3 in Fig. 2.

Fig. 4 is a fragmentary vertical section taken along line 4—4 in Fig. 2.

Fig. 5 is a cross-section taken along line 5—5 in Fig. 4.

Fig. 6 is a fragmentary elevational view taken substantially along line 6—6 in Fig. 5.

Fig. 7 is an enlarged section of a portion of Fig. 5 taken along line 7—7 thereof.

Fig. 8 is an enlarged detail view taken along line 8—8 in Fig. 1.

The present invention is adapted for general application with various designs of dynamic balance testing machines. For purposes of this disclosure the invention has been illustrated in conjunction with a wheel balancer of the type disclosed in U. S. Letters Patent No. 2,349,552 issued May 23, 1944, to H. G. Holmes. Since the construction and operation of the Holmes machine is clearly disclosed in the patent referred to, only so much of the Holmes wheel balancer will be described herein as necessary for a proper understanding of the present invention.

The wheel balancer embodying the present invention (Figs. 1 to 5) comprises a frame 6 including a base casting 7 having a vertically disposed cylindrical flange 8 and a tripodal foot 9 formed integral therewith. The foot 9 (Figs. 2, 4 and 5) comprises two feet 10 and 11 which extend laterally from the flange 8 and are braced by diagonal webs 12 and 13, respectively, and a foot 14 which extends rearwardly from the flange 8 and is braced by a diagonal web 15. Each foot has a hole 16 therein to receive a bolt, not shown, whereby the base casting can be bolted to the floor upon which it is to rest.

The cylindrical flange 8 receives and supports the lower end 24 of a column 25. A depending flange 26 of a head casting 27 (Fig. 4) fits into the upper end of column 25 and the head casting is secured to the base casting by a pair of tie rods 28 and 29. Both tie rods are identical and are spaced from each other within the column 25 transversely of the longitudinal axis of the base casting 7. As shown for example by the tie rod 29 in Fig. 4, the tie rods are threaded into the head casting from below and have their threaded lower ends extending down through apertures in the base casting. The lower end of each tie rod receives a nut 30 whereby the column, the base casting and head casting are suitably fastened together.

The lateral feet 10 and 11 are provided with a rearwardly extending flange 40 and 41, respectively (Figs. 2 and 5). These flanges 40 and 41 are recessed to receive an inwardly disposed horizontal flange of an angle 43 and 44, respectively, which is secured thereto by a bolt 42. These angles 43 and 44 extend rearwardly from the feet 10 and 11, respectively, and have their vertical flanges extending downwardly at the sides of the frame. The angles 43 and 44 (Figs. 2 and 3) are welded at their rearward ends to a back angle 45. The midportions of angles 43 and 44 are braced by a transverse angle 46 having its respective ends welded to the side angles in a manner to position the vertical flange 47 of angle 46 in abutment with the end of the foot 14 to which it is secured by cap screws 48 (Fig. 4).

At the rear corners of the frame there are upstanding angles 49 and 50 having their lower ends welded to the respective side angles 43 and 44 and the adjacent end of the back angle 45. At each side of the frame is an upstanding leg 51 and 52, respectively, in the form of an elongated plate having its lower end welded to the respective side angle 43 and 44 adjacent the transverse angle 46. At the forward end of each of the side angles 43 and 44 there is a vertical strut 53 and 54, respectively, each having its lower end welded to the respective side angle and its upper end disposed in the same plane as the upper ends of the legs 51 and 52.

The upper portion of the frame is formed by a continuous strap 55 having at the ends thereof inwardly extending flanges 56, and 57, respectively. As seen in Fig. 2 the head casting 27 has a pair of laterally extending flanges 58 and 59 to which the strap flanges 56 and 57, respectively, are bolted as shown at 60. The strap 55 is bent at approximately 45° adjacent its flanges 56 and 57 and is again bent 45° just in advance of its convergence with the upper end of the vertical struts 53 and 54 so that it rests upon the latter. The bottom edge of the strap 55 is welded to the upper end of the respective struts 53 and 54 and is also welded to the upper ends of the legs 51 and 52 referred to above. The mid-portion of the strap 55 continues around the rearward side of the frame and rests on the upper ends of the corner angles 49 and 50 to which it is welded. The frame 6 is completed by a transverse U-channel 65 extending flanges down between the upper ends of the legs 51 and 52. This channel 65 has its ends welded to the strap 55 so that the upper face of the channel is in the same plane as the upper edge of the strap.

An adjustable body support, indicated generally at 70 (Figs. 1 and 4), is mounted in the frame above the column 25. This body support comprises an arbor 71 having suitably secured thereto between its ends, a trunnion block 72 having axially aligned trunnions 73 and 74 extending laterally therefrom. The head casting 27 has formed integrally therewith the lower half of a trunnion carriage 75 which supports the trunnions 73 and 74. A pair of caps 76 and 77 forming the upper half of the trunnion carriage are bolted to the lower half thereof as shown at 78. The trunnion carriage is provided with friction type bearings (not shown) which clamp sufficiently tight around the trunnions 73 and 74 to support the arbor so that it can be readily shifted by hand from vertical to horizontal position and vice versa, but is not free to do so unless some external force is exerted upon it. In order to permit the foregoing movement of the arbor the head casting 27 and the rearward side of the upper end of the column 25 are both slotted as shown at 80 (Fig. 5).

The movement of the arbor between its two extreme positions is cushioned in the same manner as shown in the aforementioned patent by a pair of compression springs each encompassing the respective tie rods 28 and 29 mentioned above. For example as seen in Fig. 4 one compression spring 82 is arranged on the tie rod 29 to bear against the under side of the head casting 27 and a cross head 83 is slidably arranged on the tie rods to bear against the lower ends of the springs. The cross head 83 is pivotally connected to double links 84, the opposite ends of which are pivotally connected to a lug 85 secured to the lower portion 79 of the arbor.

The arbor 71 is held in the two extreme positions in the same manner as shown in the Holmes patent. When in its vertical position the arbor is held by a latch 90 pivotally connected at 91 to the lower extremity of the arbor and having a slot 92 to receive a pin 93 extending between ears 94 formed on the column 25. The latch also has a recess 95 communicating with the slot 92 and a leaf spring 96 engaging the arbor 71 is secured to the upper edge of the latch so as to maintain the latch in engagement with the pin 93 and to seat the same in the recess 95. This latch is released in the same manner and for the same purpose as in the aforementioned patent by a push rod 100 slidably arranged in brackets 101 within the column 25. The lower end of rod 100 is pivotally connected at 109 to a lever 106 extending forwardly of the machine and through an aperture 108 in the cylindrical flange 8. The aperture 108 in the flange 8 provides a fulcrum for the lever 106 whereby the latter can be operated by pressing down upon a foot pedal 105 secured to the free end of the lever.

The frame 6 is enclosed within a metal housing 110 which conforms to the general outline of the frame and is provided with the necessary openings to permit portions of the mechanism to extend through the housing. As seen in Fig. 4 the upper surface 111 of the housing is in substantially the same plane as the upper edge of the trunnion carriage 75 hereinbefore referred to. As further seen in Figs. 1 and 5 there is a hump 115 formed on the upper surface of the housing above the column 25. This hump has a slot 116 formed therein corresponding to and diametrically opposite to the slot 80. The slot 116 is so disposed relative to the trunnions 73 and 74 as to permit movement of the arbor from horizontal to vertical position and vice versa as hereinbefore explained.

As seen in Fig. 3 the rearward portion of the housing is raised substantially above the upper surface 111 thereof to provide a table-like control panel 120. This control panel 120 is to the rear of the transverse channel 65 and extends laterally of the general outline of the frame as best seen in Figs. 1 and 2.

The outer end of the arbor 71 has a bushing 121 arranged thereon for reciprocable movement relative thereto. Secured to the lower portion of the bushing 121 is a reciprocable hub 122 while the upper portion of the bushing has secured thereto the inner race 123 of a ball bearing unit 124. A compression spring 125 is arranged on the arbor and rests upon the bushing 121. An inverted frusto-conical collar 126 bears against the spring 125 and is held thereagainst by a snap ring 127 seated in an annular groove 128 in the arbor. In this manner the bushing and reciprocable hub are continually urged downwardly into yielding engagement with curbings 129 and 130 formed on the two trunnion caps 76 and 77, respectively, adjacent the margins of the slot 116.

The arbor 71 extends through the slot 116 in the hump 115 of the housing 110. The outer end of the arbor is provided with a shoulder 131 against which the inner race of a self-aligning ball bearing 132 is held by a washer 133 and a cap screw 134. A spindle 135 having its inner end formed as a hollow cylindrical quill 136 fits over the arbor. The spindle 135 is supported on the outer race 137 of bearing 132 thus permitting universal tilting movement of the spindle relative to the vertical axis of the arbor.

The open end of the quill has a counterbored portion 138 which is adapted to receive the outer race 139 of the ball bearing unit 124 heretofore referred to. The inner end of the spindle has an external shoulder 140 adjacent the open end thereof as seen in Fig. 4 and a collar 141 firmly fits over the quill and rests on the shoulder 140. This collar has its peripheral edges 143 and 144, adjacent its parallel top and bottom surfaces, respectively, ground to present a frustum of a sphere having a central peripheral band of cylindrical shape.

A wobble plate 145 having a hub portion 146 freely encompasses the collar 141 and is frictionally held in place thereon by a series of leaf springs 147. The leaf springs are secured inside the hub 146 in equally spaced grooves 148 formed in a flange 149 extending inwardly from the upper edge of the hub. The inner face 151 of the flange 149 is ground to fit over the spherical surface of the upper peripheral edge 143 of the collar 141 so that the upper edge of the hub is slightly below the upper edge of the collar. The free ends of the leaf springs 147 are bent inwardly to frictionally engage the spherical surface of the lower peripheral edge 144 of the collar. The leaf springs 147 frictionally engage the collar to maintain the wobble plate in adjusted position relative to the collar but permit tilting of the same about the collar when an outside force is applied to the wobble plate.

A leveling plate or equalizer in the form of a washer 155 is arranged on the spindle over the collar 141 and extends over the upper edge of the hub 146 to limit the tilting of the wobble plate. A cone 160 is arranged on the spindle to hold the washer 155 in place and has a lower internal flange 161 and an upper internal flange 162 each of which engage the spindle exteriorly of the quill.

A wheel 165 with a tire 166 thereon is mounted on the spindle with the outer race 167 of the inner wheel bearing seated on the cone 160. A second cone 168 having a bore 169 fits over the spindle shank and seats in the outer wheel bearing 170. A washer 171 is arranged on the threaded end of the spindle shank which receives a nut 172 for securing the wheel in axial alignment with the spindle.

A vertically disposed bushing 175, Figs. 2, 3 and 4, is arranged on the transverse channel 65 to one side of the longitudinal axis of the frame. This bushing 175 has its upper portion welded at 176 to the rearward flange 177 of the channel 65 with the upper face of the bushing flush with the top surface of the channel web. The bushing is further secured to the channel by a brace plate 178 extending forwardly therefrom and having its upper edge welded to the flanges and web of the channel.

A swinging bracket 180 is mounted on the bushing 175. This bracket has bosses 181 and 182 in axial alignment with the bushing and bore to receive the ends of a spindle 183 extending through and secured to the bushing by set screws 184. The outer end of the bracket 180 has a vertical boss 185 formed thereon to receive the lower end of a tubular pole 186. The boss 185 is split at 187 and is tightly clamped upon the pole 186 by bolts 188 to firmly secure the pole to the bracket 180.

Arranged on the pole 186 is a split boss 189 of a bracket 190 which split boss 189 is tightly clamped to the pole by bolts 191. The bracket 190 extends through an opening 192 formed in a vertical wall 193 at the forward side of the control panel 120 (Fig. 4). The outer end of the bracket 190 has bolted thereto at 194 an electric motor 195 to support the same for swinging movement above the frame and in an arcuate slot 196 formed in the upper surface 111 of the housing as is best seen in Figs. 1 and 4. The motor has a drive shaft 197 extending upwardly therefrom and keyed to this shaft is a drive pulley 198 having its outer periphery disposed to tractionally engage the tread of the tire 166 when the bracket 180 is swung toward the same.

The upper end of the pole 186 is reduced to provide a shoulder 200 and to receive and support a sleeve shaft 201 for rotation thereon. Secured to the sleeve shaft by set screws 202 is the hub portion 203 of a laterally extending brake shoe 204 which also extends through the opening 192 in the wall 193. A brake lining 205 is secured to a concaved face 206 of the brake shoe and is adapted to frictionally engage the drive pulley 198 when the sleeve shaft is swung counterclockwise as seen in Fig. 1.

The free end of the pole and the sleeve shaft 201 extend up through an arcuate slot 207 in the control panel 120 a sufficient distance to provide a vertical handgrip whereby the bracket 180 can be manually swung toward and away from the wheel 165. Secured to the upper end of the sleeve shaft 201 is a handle 208 whereby the sleeve shaft and brake can be swung relative to the pole 186.

The handle 208, as seen in Fig. 8, is hollow and has a toggle switch 209 secured therein by screws 210. Electric current is supplied from a power supply line as seen in Fig. 3 by way of a main plug 211 having lead-in wires 212 and 213. The lead-in wire 213 is connected to a main switch 214 mounted on the back wall of the housing 110. A conductor 215 leading from the main switch 214 is connected to one binding post 216 of a transformer 217, mounted on the leg 52 of the frame 6. The conductor 215 extends from the binding post 216 up through the tubular pole 186 for connection to one side of the toggle switch 209 in the handle 208. From the other side of the toggle switch 209 a wire 218 extends down into the tubular pole 186 and out of the same through an aperture 219 just below the shoulder 200 upon which the sleeve shaft 201 is supported. The wire 218 is connected to the motor 195 which in turn has connected thereto a wire 220 leading back through the aperture 219 and down through the pole 186 for connection to the other binding post 221 of the transformer 217. The binding post 221 is directly connected to the lead-in wire 212 extending into the housing from the main plug 211.

As shown in Figs. 2 and 5, the trunnion caps 76 and 77 are provided with horizontally aligned bosses 230 and 231 to the rear of the arbor and supported in these bosses is a rocker shaft 232. The ends of this rocker shaft extend beyond the bosses 230 and 231 and have secured thereto the hub portion 233 of a rocker arm 234 and 235, respectively. The forward ends of the rocker arms 234 and 235 extend up through a slot 236 and 237, respectively, in the top surface 111 of the housing 110 on either side of the hump 115. The free upper end of each rocker arm has an outwardly extending boss formation 238 and secured thereto by a cap screw 239 (Fig. 6) is a disc or relatively thick bronze washer 240. The rocker arm 235 has a rearwardly extending lever arm 245 with a clevis end 246 which embraces the forward end of an actuating lever 247. The clevis end 246 is pivotally connected to the lever 247 by a headed pin 248 secured in place by a cotter pin 249.

The actuating lever 247 is fulcrumed midway between its ends on a bolt 255 supported in an upstanding bracket 256 welded to the upper surface of the channel 65. As seen in Fig. 3 the opposite end 257 of the actuating lever 247 is twisted into a horizontal position and has an aperture 258 formed therein to receive the lower end of a plunger 260. The plunger 260 is threaded to receive bolts 261 and 262 having rounded heads engaging the upper and lower faces, respectively, of the horizontal end 257 of the lever 247 to permit rocking movement and adjustment of the lever relative to the plunger. An angle bracket 263 is welded to the forward flange of the channel 65 beneath the forward arm of the actuating lever 247 and a stop or bolt 264 is threaded up through the bracket 263 and held in adjusted position thereon by a lock-nut so that the downward movement of the forward arm of the lever is limited.

A compression spring 265 surrounds the plunger 260 and is seated on a retaining washer 266 held in elevated position on the plunger by a cotter pin 267. The upper end of spring 265 engages the lower face of the control panel 120 so that the plunger is urged downwardly. The plunger extends up through an opening in the panel 120 to receive a knob 269 which is secured to the plunger for limiting downward movement of the same under the influence of the spring 265. The knob 269 provides a finger grip whereby the plunger can be manually raised to rock the actuating lever 247 and rocker arms 234 and 235 to thereby raise the discs 240 toward the wobble plate 145. It will be noted that the periphery of the discs 240 are ground arcuately toward the side faces thereof so as to form a ball-like surface on the periphery of the discs. It is further to be noted that the discs 240 are eccentrically mounted relative to the cap screws 239 so that the discs can be adjusted to raise or lower their ball-like surfaces relative to the wobble plate 145 Fig. 6.

Arranged within the housing 110 (Figs. 1, 2, 4 and 5) is an optical indicator generally designated 290 which includes a light source 291, a projector 292, a reflector surface 293, a plurality of mirrors I, II, and III and a screen 294.

In the preferred construction as seen in Fig. 5 the light source is a 6 volt lamp 295 mounted in a socket 296, both of which are of a type generally known to the automotive industry. The socket 296 is supported on a bracket 297 secured at 298 to a bracket 299 bolted to the foot 11 to the left of the column 25 (Fig. 5).

Electric current is supplied to the lamp 295 from the secondary winding of the transformer 217 mentioned above. As explained above the primary winding of the transformer is connected to the power supply line and is controlled by the main switch 214. As best seen in Figs. 3 and 4 one binding post 300 on the secondary side of the transformer is connected to a wire 301 which in turn, as seen in Fig. 5, is connected to a center contact (not shown) within and insulated relative to the socket 296. The socket is grounded through brackets 297 and 299 to the frame 6 and the other binding post 302 of the secondary side of the transformer 217 is also grounded to the frame 6 thereby establishing a closed circuit to the 6 volt lamp 295.

Likewise secured to the bracket 297 is a U-shaped bracket 305 as shown in Fig. 5. The lower arm of the bracket 305 has an opening 306 including a shoulder 307 on which a concaved reflector 308 is held in place by a snap ring 309. The upper arm of the bracket 305 has a split sleeve 310 which supports a projector tube 311 in a fixed position within the frame 6. The sleeve 310 is clamped onto the lower end of the projector tube by means of a cap screw 312 threaded through lateral ears 313 formed as a part of the split sleeve 310.

A U-shaped shield 320, Figs. 5 and 7, is arranged on the bracket 305 to close the open end thereof and has its sides secured to the sleeve 310 by screws 321 so as to form a lamp housing around the light source 291. A disc 322 is secured against the lower end of the projector tube by screws 323 and as best seen in Fig. 7 this disc has a pin hole or aperture 324 formed therein. The aperture 324 is in axial alignment with the projector tube so that a beam of light passes from the lamp 295 and silvered reflector 308 up through the projector tube 311.

The upper end of the projector tube 311 has a cylindrical cap 325 secured thereto and mounted within this cap is an achromatic lens comprising a plano-concaved lens 326 seated on the end of the projector tube and a double-convex lens 327 overlying the plano-concaved lens. These lenses are held tightly against the upper end of the projector tube by an expansion ring 328 seated in an annular groove 329 formed in the inner wall of the cap 325.

The reflector surface 293 is carried by the wobble plate as best seen in Figs. 4 and 5, and is preferably a plate glass mirror 330. This mirror is of circular shape and has a central opening 331 formed therein as shown in Fig. 4 to surround but not touch the free ends of the leaf springs 147 of the wobble plate. The mirror 330 is secured against the lower face of the wobble plate by an adhesive or cement and the periphery of the mirror is guarded by a flange 332 formed as a periphery of the wobble plate. The face of mirror 330 is silvered and protected by a transparent hard surface coating. It will be noted in Figs. 4 and 5 that the projector tube 311 is in a vertical plane transversely of the machine and is disposed at an angle across the machine to project a beam of light toward the rearward portion of the mirror 330. Therefore, when the mirror 330 is in normal position, i. e. perpendicular to the axis of the arbor 71, the reflection of the light beam will be reflected in the same vertical plane as the projected light beam and downwardly at an angle of reflection corresponding to the angle of incidence of the projected light beam relative to the mirror. This vertical plane which includes both the projected and the reflected beam of light is the normal plane of incidence designated N along the line 5—5 of Fig. 4 and as seen in elevation in Fig. 5. The light beam as reflected by the mirror 330 is in the form of a light pencil which will produce a spot of light on a surface which intercepts the same. This light pencil is ultimately directed toward the inner side of the screen 294 which, in the present instance, is a translucent panel capable of absorbing the image of the light spot caused by the light pencil to render the light spot visible on the outer side of the screen.

As best seen in Figs. 1 and 3, the screen 294, is arranged on an annular flange 33 formed in a depressed portion of the control panel 120 to one side of the longitudinal axis of the machine. The screen 294 is secured in place by a flanged retaining ring 334 secured to the annular wall of the depressed portion of the panel by screws 335. The entire light pencil is concealed within the housing 110 so as not to diminish the intensity of the light thereof. In order to properly direct the light pencil from the mirror 330 toward the screen in the present disclosure, the light pencil must again be reflected upwardly. For this purpose a main reflecting mirror, designated I, is disposed on a bracket 336 (Figs. 4 and 5) secured to foot 10 adjacent to the column 25 opposite the projector and in the normal plane of incidence N so that a light pencil projected in said plane when the mirror 330 is level, strikes the mirror I at its center. This mirror I is so positioned that the aforesaid light pencil will be reflected in a plane R which is at right angles to the plane N (Fig. 2) and at an angle upwardly (Fig. 4) in the direction of the screen 294.

Since the variations in angle of reflection caused by tilting of the wobble plate 145 are slight, in order to perceive any appreciable difference thereof the light beam must be projected a sufficient distance therefrom. In the present instance the distance between mirror I and the screen is increased by redirecting the pencil of light between the top and bottom of the housing several times.

In order to accomplish the foregoing, second and third mirrors are arranged in the plane R which includes the centers of both the screen and mirror I. The second mirror, designated mirror II, is suspended on a bracket 337 extending forwardly from the transverse channel 65. The third mirror, designated III is supported directly below the screen on a bracket 338 extending between transverse angle 46 and back angle 45. Each of the mirrors I, II and III is of increased size in accordance with its nearness to the screen so that the light pencil will be successively transmitted thereby toward the screen. In this manner the variance in angle of reflection of the light pencil relative to normal will be of sufficient magnitude to be easily measured on the screen. While the foregoing arrangement is best suited for the apparatus disclosed herein it will be apparent to those skilled in the art that the number of mirrors may be varied to suit the particular arrangement of the screen relative to the wobble plate mirror 330.

The screen (Fig. 1) has a central or zero point thereon lying in the plane R. A series of circular indicia 340 are concentrically arranged about the zero point and are graduated in diameter to provide a scale calculated to indicate, in ounces, the amount of dynamic unbalance in a wheel being tested. The amount of dynamic unbalance is therefore measured in accordance with the distance of the spot of light from the center of the screen.

The screen is further divided into quadrants by hair lines 341 and 342 intersecting at the zero point thereof. The hair line 341 is preferably parallel to the longitudinal axis of the machine and the hair line 342 parallel to the transverse axis of the machine. These hair lines assist in locating the dynamic unbalance of the wheel.

Each mirror I, II and III (Figs. 2 to 5) is mounted in and cemented to a supporting pan 345 having a ball 346 suitably secured to its back face 347. The ball 346 of each pan 345 is arranged in a socket 348 in turn secured to the respective brackets 336, 337 and 338, heretofore referred to, so that the mirrors are frictionally held in the desired position of adjustment within the housing.

Referring now to Figs. 2 and 4, the curbings 129 and 130 at the margins of the slot between trunnion caps 76 and 77 form a track on which the reciprocable hub 122 slides as the arbor 71 is swung from one position to the other. The portion of each curbing 129 and 130 forwardly of the arbor is eccentric with respect to the axis of the trunnions 73 and 74 so that the distance between trunnions and curbings is greater in a horizontal direction than in a vertical direction. Consequently, the curbings 129 and 130 act as a cam to urge the reciprocable hub 122 outwardly on the arbor when the latter is swung into a horizontal position. This movement of the hub 122 introduces the ball bearing unit 124 into the counterbore 138 of the quill to prevent tilting of the spindle and to confine the latter to rotation coaxially with respect to the arbor when the same is in horizontal position.

Referring now to Figs. 2 and 6, it will be noted that the boss 239 formed as a part of the trunnion cap 76 has an upwardly extending integral arm 350. A spindle centering lever 351 is pivotally mounted on the arm 350 by a stud bolt 352. The forward end of this lever 351 carries a roller 353 for rotation on a stud bolt 354 (Figs. 1 and 2). The roller 353 is adapted to engage the underside of an annular flange 355 formed as a part of the reciprocable hub 122 hereinbefore mentioned when the arbor is held in vertical position.

The rearward portion of the lever 351 has a depending lug 356, see Fig. 6, into which is threaded a stop bolt 357 carrying a lock nut 358 and is set to engage the arm 350 to limit upward movement of the roller 353. The rearward end of the lever 351 is U-shaped and has a pin 360 extending between its legs. A rod 361 extending upwardly between the legs of the lever 351 is threaded into an opening 362 in the pin 360 (Fig. 2). The rod 361 as seen in Fig. 4, extends down through an aperture 363 formed in an oblique end 364 of a lever 365. A compression spring 366 encompasses the lower end of the rod 361 to engage the lower face of the oblique end 364 of the lever 365 and is held in place by a washer 367 and a pair of lock nuts 368.

The lever 365 is fulcrumed at its mid-section on a stud bolt 370 carried by a lug 371 extending upwardly from the foot 14 and the rearward end 372 of the lever 365 is bent laterally as shown in Figs. 2 and 3. The end 372 of the lever 365 is engaged from below by the inner end of a foot operated lever 373 pivoted on a pin 374 supported between spaced lugs 375 carried by the back angle 45 of the frame 6. The outer end of the lever 373, as seen in Figs. 2 and 3, extends through a suitable slot 376 formed in the housing 110 and has a foot pedal 377 secured thereto.

It is while the wheel is supported for rotation about a horizontal axis, as seen in Fig. 1, that the static balance is corrected by applying a compensating balance weight in a proper position on the rim of the wheel. Thereafter the wheel is swung from dotted to full line position as seen in Fig. 4 with the arbor 71 latched in vertical position. In this position the reciprocable hub 122 and ball bearing 124 are urged free of the quill by spring 125 and the spindle 135 and wheel 165 are free for universal tilting relative to the vertical axis of the arbor. The swinging bracket 180 and pole 186 thereon are swung toward the wheel to cause the drive pulley 198 to engage the tread of the tire 166. The main switch 214 is turned on completing the circuit to the lamp 295 and the motor switch 209 in the handle 208 is operated to complete the electric circuit to the motor to drive the pulley 198 and the wheel 165. When the wheel is rotating at the desired number of revolutions per minute the bracket 180 and pole are swung away from the wheel and the switch 209 is turned off. Thereafter, the wheel and spindle 135 will spin under their own momentum on the self-aligning ball bearing unit 132 on the arbor 71.

If the wheel is dynamically unbalanced the dynamic forces set up during the spinning of the wheel tend to tilt the same at an angle relative to its normal plane of rotation depending upon the amount and location of dynamic unbalance in the wheel. Consequently, the spindle 135 tilts on the self-aligning bearing 132, so that the wheel, spindle and wobble plate gyrate with their axis of rotation traveling in a conical orbit about the vertical axis of the arbor. When this occurs the axis of the spindle makes one circuit of the conical orbit for each revolution of the wheel.

The knob 269 is then pulled upwardly for a few moments rocking the actuating lever 247 clockwise to the dotted line position against the stop bolt 264 as seen in Figs. 2 and 3. The lever arm 245 and rocker shaft 232 are thereby rocked counter-clockwise, as seen in Figs. 4 and 6 swinging rocker arms 234 and 235 upwardly into a position where the ball-like surfaces of both discs 240 engage the plate glass mirror 330 of the wobble plate. The wobble plate is thereby tilted relative to the spherical hub 141 until the plate and mirror rotate in a plane parallel to the plane of travel of the center of gravity of the wheel, i. e. perpendicular to the arbor 71. The knob 269 is then released and the actuating lever and rocker arms are urged into normal position by the compression spring 265. The leaf springs 147 on the wobble plate 145 frictionally grip the spherical hub and maintain the wobble plate and mirror in adjusted position relative to the spindle 135, i. e., at an angle relative to the spindle equal and opposite to the angular position of the spinning wheel relative to the arbor 71.

The bracket 180 and pole 186 are again swung toward the wheel, this time without turning on the motor, so that the drive pulley 198 now engages the tread of the tire to retard the spinning of the wheel. The handle 208 is at the same time turned (counterclockwise, Fig. 1) toward the wheel to rotate the sleeve shaft 201 and brake shoe 202 so that the lining 205 thereof frictionally engages the drive pulley to retard rotation of the latter thereby stopping the wheel. The bracket 180 and pole 186 are then swung away from the wheel which may now be rotated by hand.

The operator then steps on the foot pedal 377 to raise the inner end of the lever 373, rocking the lever 365 clockwise Figs. 3 and 4 to pull the rod 361 downwardly. The centering lever 351 is thereby rocked counterclockwise (Figs. 4 and 6) until its stop bolt 357 engages the arm 350. In this manner the roller 353 is raised into engagement with the annular flange 355 on the reciprocable hub 122 lifting the latter and ball bearing unit 124 into the counterbore 138 of the spindle quill. The spindle 135 is thereby centered with respect to the arbor 71 so that the wheel and spindle will now rotate coaxially relative thereto. Therefore, when the wheel is now rotated slowly the wobble plate which is tilted on the spherical hub will simulate the wobbling action previously displayed by the wheel when it was spinning.

The lamp 295 is already illuminated and a beam of light emanating from the projector 292 is projected toward the reflector surface 293 on the wobble plate. When the wheel is positioned with the wobble plate and mirror 330 tilted up as shown in Fig. 6, the image of the light beam striking the latter will be reflected at an angle rearwardly of the normal plane of incidence N and will strike mirror I, for example, at point $a$ in Fig. 4.

Accordingly, the angle of reflection of the light pencil from point $a$ on mirror I will be greater than a reflection from the centermost point of mirror I. The corresponding angle of reflection from mirrors II and III will also be greater than in the case of a dynamically balanced wheel. Consequently, the light pencil reflected from point $a$ on mirror I and mirrors II and III will strike the lower face of the translucent panel or screen 294 to display a light spot $a'$ on the screen along hair line 341 thereof as seen in Fig. 1. The direction of the light spot from zero on the screen will indicate, by comparison with the wheel, the location of dynamic unbalance in the wheel. At the same time, the distance of the light spot from the zero point on the screen in accordance with the calibrations on the scale thereof, will indicate the amount of dynamic unbalance of the wheel.

When the wheel is positioned 90° clockwise from the position shown in Fig. 6, the axis about which the wobble plate is tilted is at right angles with respect to the plane of incidence N. The light beam reflected from the reflector surface in such case remains in the normal plane of incidence N but the angle of reflection is less than that of a balanced wheel so that the beam of light strikes mirror I at a point $b$ as seen in Fig. 5.

Point b is 90° from point a relative to the center of mirror I and is the same distance away from the center thereof as is point a. Since point b lies in the plane of incidence N, the reflection of the light pencil therefrom is at an angle corresponding to the angle of reflection of the light pencil in the case of a perfectly balanced wheel. However, the angle of incidence of the light pencil at point b is less than in the case of a balanced wheel. Therefore, due to the tilted position of mirror I, the reflection of the light pencil from point b is reflected from mirror I in a plane diverging inwardly of the machine relative to plane R. Consequently the light pencil strikes mirrors II and III to the left of their centers as seen in Fig. 2. This causes the light spot to appear on the transverse hair line 342 of the screen at point b' thus indicating the location of dynamic unbalance. The radial distance of point b' from the zero point on the screen indicates the amount of dynamic unbalance according to the calibrations of the scale.

When the wheel is turned another quarter revolution with the wobble plate tilted down, i. e. opposite to the position shown in Fig. 6, the image of the light beam is cast from mirror 330 forwardly of the normal plane of incidence N. Consequently, the light beam will strike mirror I in alignment with the plane R at a point c above the center of the mirror as seen in Fig. 2. The light pencil reflected from point c will strike mirrors II and III, as well as the translucent panel or screen 294 forwardly of the centers thereof to display a light spot at c' on the screen along hair line 341 as seen in Fig. 1. Point c' is a distance from the zero point of the screen corresponding to the amount of dynamic unbalance on the calibrated scale. At the same time the location of the dynamic unbalance is indicated as being along a diametrical axis of the wheel parallel to the hair line 341 upon which the light spot is located.

With the wheel positioned three-quarters of a revolution from the original position referred to above, the light beam strikes the reflector surface 293 so that the image is reflected in the normal plane of incidence N at a greater angle of reflection than in the case of a balanced wheel. Therefore, the light pencil will strike mirror I at point d, which is to the right of the centermost point thereof as seen in Figs. 2 and 5.

Point d is a distance from the center of mirror I corresponding to the distance of point b from the center thereof. The light pencil cast upwardly from point d is in a plane diverging outwardly of the machine relative to the plane R (Fig. 2). Since the angle of reflection from point d is the same as in the case of a balanced wheel, the light pencil from point d will strike mirrors II and III, as well as the translucent panel to the right of their centers (Fig. 2). This causes the light spot to appear on the screen along transverse hair line 342 at point d'. The distance of point d' from zero on the screen indicates the amount of dynamic unbalance of the wheel according to the calibrations of the scale. Likewise the radial direction of the light spot with respect to the zero point on the screen indicates by comparison, the diametrical axis of the wheel whereon the dynamic unbalance is located.

From the foregoing it will be seen that regardless of the location of the dynamic unbalance in the wheel relative to the vertical axis of the arbor, the light spot will appear on the screen at a similar angle relative to the zero point thereof. Therefore, even though the wheel is turned about its vertical axis the location of dynamic unbalance of the wheel will be indicated correspondingly about the zero point on the screen. It is likewise apparent that irrespective of the location of the light spot relative to the zero point on the screen the distance of the light spot therefrom according to the calibrations of the scale will be the same in all positions of the light spot relative to the zero point on the screen. In other words as the wheel is rotated the light spot will travel in a circle concentric to the zero point on the screen to indicate, at all times, the amount and location of dynamic unbalance in the wheel under test. The readings thus visualized on the calibrated screen are readily applied by comparison to the wheel since the latter is adjacent to the screen.

From the foregoing comparison between the screen and wheel, correction of the dynamic unbalance can be made by applying the necessary balance weight to the wheel. The amount of unbalance according to the scale on the screen is divided by two and balance weights of equal weight are selected for application to the rim of the wheel at opposite sides thereof. If desired the markings on the screen may be such as to indicate one half the amount of unbalance so that the weight of each balance weight may be directly read off the screen.

For the purpose of accurately determining the diametrical line across the wheel upon which the weights are to be applied, a pointer 400 is secured to the upper surface 111 of the housing 110 along the longitudinal axis of the machine as shown in Fig. 1. The wheel is then rotated until the light spot appears on hair line 341 of the screen, for instance at point a' as hereinbefore explained. With the wheel so positioned, the dynamic unbalance of the wheel is located on a diametrical axis thereof in alignment with the pointer 400.

When the light spot is at point a' on the screen the wobble plate 145 is in the position shown in Fig. 6 in which case the wheel is out of dynamic balance along its diametrical axis disposed longitudinally of the machine. The wheel and wobble plate are closest to one another to the rear of the arbor 71. Therefore one of the selected balance weights is applied to the lower or inside rim of the wheel on that side thereof corresponding to the location of the light spot a' relative to the zero point on the screen. The other balance weight is applied to the upper or outside rim of the wheel and diametrically opposite the position of the first applied balance weight.

Thereafter the foot pedal 377 is released to permit spring 125 to force the reciprocable hub 122 down against the curbings 129 and 130 on the trunnion caps 76 and 77 thereby lowering ball bearing unit 124 out of the counterbore 138 of the quill. The motor is again swung toward the wheel and the drive pulley is rotated while in engagement with the tire on the wheel to spin the latter as hereinbefore explained. The knob 269 is then pulled up to cause the discs 240 to engage the mirror 330 on the wobble plate leveling the same for rotation perpendicular to the vertical axis of the arbor. Thereafter, the wheel is stopped by applying the brake 204 to the drive pulley while the latter engages the tread of the tire 166. In the event the correction made as hereinbefore explained was successful, the quill spindle in this check test rotates about an axis coaxial with the arbor. Consequently, the wobble plate in its newly adjusted position will be parallel to the wheel and therefore, the light spot will be displayed at the zero point on the screen thus indicating that the wheel is in dynamic balance.

However, should the light spot fluctuate relative to the zero point, the location of unbalance would be indicated by the position of the light spot relative to the zero point on the screen. The weights are then shifted along the rim to overcome any deviation between the indicated location and the actual position of the weights on the wheel. If necessary a certain portion of the weight may be removed or additional amounts of weight added to the balance weights to compensate for error in the original correction.

In either event, it is apparent that the location of the dynamic unbalance is delineated on the screen after the wheel ceases spinning, and that the wheel is disposed for ready comparison with the screen so that the operator can conveniently make the necessary correction while the wheel and screen are side by side thus minimizing the possibility of error.

While the foregoing description of the mechanism and its operation refers to a specific form of construction for carrying out this invention, it is to be understood that various modifications may be made without departing from the spirit of the invention. I therefore desire to avail myself of all modifications and alternations coming within the scope of the accompanying claims.

What I claim as new and desire to protect by Letters Patent is:

1. An apparatus for checking the dynamic balance of a rotatable body comprising means for mounting said body for rotation about a reference axis and for universal tilting movement relative thereto, a reflector mounted on said body mounting means to rotate and wobble and tilt therewith and adjustable for universal tilting movement relative thereto, means for projecting a beam of light toward said reflector, means for receiving the image of said beam of light reflected from said reflector, and means for adjusting said reflector into a position normal to said reference axis while said body is rotated at a high speed and is caused to wobble about said reference axis under the influence of the dynamic unbalance of said body, whereby when said body is subsequently rotated slowly with its axis concentric to said reference axis said reflector will wobble and reflect the image of said beam of light on said image receiving means in conformity with the amount and location of dynamic unbalance of the body.

2. An apparatus for checking the dynamic balance of a rotatable body comprising means for mounting said body for rotation about a reference axis and for universal tilting movement relative thereto, a reflector adjustably mounted on said mounting means for rotation with said body and for universal tilting movement relative thereto, means for spinning said body to cause it to wobble under the influence of the dynamic unbalance thereof, means for adjusting said reflector with respect to said mounting means for rotation in a plane normal to said reference axis while said body is spinning, means for subsequently righting said mounting means for supporting said body for rotation about said reference axis without disturbing the adjusted position of said reflector, means for projecting a beam of light from a fixed source toward said reflector, and means for receiving the image of said beam of light reflected from said reflector to visibly indicate the amount and location of dynamic unbalance of the body.

3. An apparatus for checking the dynamic unbalance of a rotatable body comprising means for mounting said body for rotation about a reference axis and for universal tilting relative thereto, a reflector carried by said mounting means for rotation therewith and for universal tilting movement relative thereto, means for projecting a beam of light from a fixed source toward said reflector, means disposed in fixed relation relative to said reference axis for receiving the image of said beam of light reflected from said reflector, means for tilting said reflector relative to said mounting means into a position normal to said reference axis while said body is rotated at a high speed and is caused to wobble about said reference axis under the influence of the dynamic unbalance of the body, and means for subsequently holding said mounting means and body for rotation concentric to said reference axis without disturbing the tilted position of said reflector relative to said mounting means and body whereby the image of said beam of light is reflected upon said image receiving means in conformity with the amount and location of the dynamic unbalance of the body.

4. An apparatus for testing the dynamic balance of a rotatable body including an arbor, means for supporting said body on said arbor for free rotation and universal tilting relative thereto, means for rotating said body and supporting means whereby dynamic unbalance of the body will cause a wobbling action of the body and supporting means relative to the axis of said arbor, and an optical indicator comprising means for projecting a beam of light toward said body, a reflector connected to said body supporting means to rotate and wobble and tilt therewith, said reflector being adjustable for universal tilting movement relative to said body supporting means and adapted to intercept said light beam, means for tiltably adjusting said reflector to a position normal to said arbor during high speed rotation and wobble movement of said body, and a screen arranged to receive an image of the reflected light beam for visually indicating the amount and location of dynamic unbalance of said body upon slowly rotating said body and the thus tiltably adjusted reflector.

5. An optical indicator for balance testing apparatus comprising means for supporting a body for free rotation and universal tilting movement relative to a predetermined axis, means for spinning said body whereby dynamic unbalance thereof causes the body to wobble relative to said predetermined axis, a reflector carried by said body supporting means for rotation and wobble movement with said body and tiltably adjustable relative thereto, means for tiltably adjusting said reflector for rotation in a plane normal to said predetermined axis while said body is wobbling relative thereto, means for projecting a beam of light toward said reflector, and a screen arranged to receive an image of said beam of light from said reflector whereby when said body ceases rotating and is disposed normal to said predetermined axis, the amount and location of dynamic unbalance of said body is visually portrayed on the screen in accordance with the adjusted angle of tilt of the reflector relative to said predetermined axis.

6. A wheel balancer comprising means adapted to have a wheel mounted thereon for testing, means for supporting said mounting means with its axis normally in an upright position and permitting the wheel thereon to wobble when it has been set spinning, a reflector carried by said mounting means to rotate in unison with the wheel and adapted to be tilted with respect to said mounting means, means for engaging said reflector while the wheel is spinning and wobbling to tilt the reflector into a plane perpendicular to the normal upright position of said mounting means, said supporting means including an auxiliary means for engaging said mounting means to support the wheel for rotation about a predetermined axis, means for projecting a beam of light toward said reflector, and means for receiving the reflected image of said light beam whereby to indicate the amount and location of dynamic balance of said wheel.

7. An apparatus for checking the dynamic balance of a rotatable body comprising an arbor, a quill mounted for rotation and universal tilting movement on said arbor, said quill being adapted to have the body to be checked mounted thereon for rotation and tilting movement therewith, means for rotating said body and quill whereby unbalance of the body will cause a wobble action of the body and quill about the axis of said arbor, a reflector plate carried by said quill for rotation and wobble movement therewith and tiltable relatively thereto, means for projecting a beam of light toward said reflector plate, a screen arranged to receive the reflected image of said beam of light from said reflector plate, and means for tiltably adjusting said reflector plate for rotation in a plane perpendicular to the axis of said arbor while said body and quill are rotated, whereby when the body and quill are subsequently rotated slowly concentric to said arbor axis any adjusted tilt of said reflector plate will simulate the wobbling action of said body and quill and will reflect said beam of light on said screen to delineate thereon the amount and location of any dynamic unbalance of the body.

8. An apparatus for checking the dynamic balance of a rotatable body comprising a vertical arbor, a spindle for supporting said body on said arbor for free rotation and universal tilting relative thereto, means for rotating said body and spindle whereby the dynamic unbalance of the body will cause a wobbling action of the body and spindle relative to the vertical axis of said arbor, a reflector carried by said spindle and tiltable relative thereto, means for projecting a beam of light toward said reflector, a charted screen arranged to receive an image of said beam of light from said reflector, means for adjusting said reflector for rotation in a plane perpendicular to the vertical axis of said arbor while the axis of said spindle is inclined relative to the arbor due to wobbling of the body, and means for engaging said spindle for causing the same and said body to rotate coaxially with respect to said arbor whereby said reflector will simulate said wobbling action of the body and reflect the image of said light beam on to said charted screen to delineate thereon the amount and location of dynamic unbalance in the body.

9. An apparatus for checking the dynamic balance of a rotatable body comprising a spindle for supporting said body for free rotation about a vertical axis and for universal tilting movement relative thereto, reflector means carried by and surrounding said spindle for rotation coaxially therewith and tiltable relative thereto, means for projecting a beam of light toward said reflector, a screen arranged to normally receive at a zero point thereon an image of said beam of light from said reflector, means for rotating said body and spindle whereby dynamic unbalance of said body will cause precession of the axis of rotation of the body and spindle relative to said vertical axis, and means for tilting said reflector to dispose its axis vertical during precession of the axis of rotation of the body and spindle whereby when said body and spindle are subsequently rotated slowly about said vertical axis said reflector will cast the image of said beam of light upon said screen in a radial direction relative to said zero point corresponding to the location of the dynamic unbalance in the body.

10. An apparatus for checking the dynamic balance of a rotatable body comprising a spindle for supporting said body for free rotation and universal tilting movement relative to the normal axis of rotation thereof, reflector means carried by and surrounding said spindle for rotation coaxially therewith and tiltable relative thereto, means for projecting a beam of light toward said reflector, a screen arranged to receive at a zero point thereon an image of said beam of light from said reflector, means for rotating said body and spindle whereby dynamic unbalance of said body will cause precession of the axis of rotation of the body and spindle relative to the normal axis of rotation thereof, means for tilting said reflector to dispose its axis of rotation parallel to the normal axis of rotation of said spindle during precession of the axis of rotation of the body and spindle, and means for engaging said spindle for aligning the same with the normal axis of rotation thereof whereby said reflector will cast the image of said beam of light upon said screen in a radial direction relative to said zero point corresponding to the location of the dynamic unbalance in the body.

11. An apparatus for checking the dynamic balance of a rotatable body comprising an arbor, means for mounting said body on said arbor for universal tilting movement, detector means carried by said mounting means and having a light reflecting surface surrounding the same for rotation coaxially therewith and for adjustment relative thereto, means for projecting a light beam in a predetermined plane of incidence toward said light reflecting surface and at a predetermined angle with respect to said surface whereby an image of the light beam is reflected therefrom in a plane congruent to the plane of incidence, means for rotating said body and mounting means therefor whereby dynamic unbalance of the body will cause wobbling of the body and mounting means about the vertical axis of said arbor, means for adjusting said detector means into a position with its axis parallel to the axis of said arbor while said body and mounting means therefor are wobbling, means for subsequently aligning the axis of said mounting means with the axis of said arbor whereby said detector means will simulate the wobbling of said body to cause the image of said light beam reflected by the light reflecting surface thereof to deviate from said predetermined angle and plane of incidence in accordance with the amount and location of dynamic unbalance in the body, and a light receiving surface arranged to intercept the image of said light beam reflected from said light-reflecting surface to thereby register the amount and location of dynamic unbalance of said body.

12. An apparatus for checking the dynamic balance of a rotatable body comprising a vertical arbor, a spindle for supporting said body on said arbor for free rotation and universal tilting relative thereto, reflector means carried by and surrounding said spindle for tilting movement relative thereto and for rotation coaxially therewith, means for projecting a beam of light toward said reflector, a screen arranged to receive at a zero point thereon an image of said light beam from said reflector, means for rotating said body and spindle whereby dynamic unbalance of said body will cause a wobbling action of the body and spindle about the axis of said arbor, means for engaging said reflector for tilting the same relative to said spindle for rotation in a horizontal plane while said body is wobbling whereby when said body is subsequently rotated with its axis concentric with the axis of said arbor the reflector will simulate the wobbling action of the body, and means for stopping the rotation of said body and reflector so that the latter reflects the image of said light beam in a direction radially relative to said zero point and at a distance therefrom to indicate the amount and location of dynamic unbalance of the body.

13. In an apparatus for checking the dynamic unbalance of a rotatable body including means for supporting a wheel for free rotation about a predetermined axis and universal tilting movement relative thereto and means for rotating said wheel at a high speed to cause a dynamically unbalanced wheel to wobble relative to said predetermined axis in accordance with the amount and location of dynamic unbalance in such wheel, the combination therewith of an optical indicator comprising a wobble plate operatively connected with said wheel supporting means for rotation coaxially with said wheel and for tilted adjustment relative thereto, means for adjusting said wobble plate for rotation in a plane normal to said predetermined axis as said wheel is wobbling relative thereto, means for projecting a beam of light toward said wobble plate, a screen having calibrations thereon, said wobble plate having a light reflecting surface for intercepting said beam of light and for reflecting the same toward said screen to indicate thereon the amount and location of dynamic unbalance in said wheel in accordance with the angle of tilt of said wobble plate when the wheel is disposed coaxially with respect to said predetermined axis of said wheel supporting means.

14. In a balance tester for a rotatable body including means for supporting said body for rotation about a reference axis and for tilting action with respect thereto during spinning of the body so that dynamic unbalance thereof causes the body and supporting means to wobble relative to the reference axis, the combination therewith of an optical indicator comprising a reflector carried by said supporting means for rotation therewith and adapted to be tiltably adjusted relative thereto, means for adjusting said reflector for rotation perpendicular to said reference axis during spinning and wobbling of said body and supporting means whereby said reflector assumes a tilted position relative to the body, means for holding said supporting means coaxially with said reference axis, means for projecting a light beam from a fixed source toward said reflector whereby an image of said beam is reflected therefrom in accordance with the position of adjustment thereof, and means disposed in fixed relation relative to said body when it is held by said holding means for receiving an image of said light beam at a predetermined point thereon when said reflector is parallel to said body whereby when said reflector is in tilted position with respect thereto said image is reflected toward said image receiving means in a direction radially relative to said predetermined point and at a distance therefrom corresponding to the location and amount of dynamic unbalance of said wheel.

TRACY CARRIGAN.

REFERENCES CITED

The following references are of record in the file of this patent:

UNITED STATES PATENTS

| Number | Name | Date |
| --- | --- | --- |
| 1,412,997 | Bonneau et al. | Apr. 18, 1922 |
| 2,338,057 | Peterson | Dec. 28, 1943 |
| 2,349,552 | Holmes | May 23, 1944 |